(12) United States Patent
Inouchi

(10) Patent No.: US 6,418,080 B2
(45) Date of Patent: Jul. 9, 2002

(54) UNDERWATER DETECTION APPARATUS

(75) Inventor: Mitsuhiro Inouchi, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 0 days.

(21) Appl. No.: 09/775,490

(22) Filed: Feb. 2, 2001

(30) Foreign Application Priority Data

Mar. 31, 2000 (JP) ........................ 2000-097519

(51) Int. Cl.[7] .................. G01S 3/86; G01S 15/96
(52) U.S. Cl. .............. 367/87; 367/99; 367/903; 367/908
(58) Field of Search ............... 367/87, 88, 99, 367/101, 111, 903, 908

(56) References Cited

U.S. PATENT DOCUMENTS

| | | | | |
|---|---|---|---|---|
| 3,613,068 A | * | 10/1971 | Thompson et al. | 367/903 |
| 3,952,279 A | * | 4/1976 | Frederiksen et al. | 367/109 |
| 4,139,834 A | * | 2/1979 | Matsui et al. | 367/87 |
| 4,400,803 A | * | 8/1983 | Spiess et al. | 367/88 |
| 5,060,205 A | * | 10/1991 | Phelan | 367/98 |
| 5,432,755 A | | 7/1995 | Komninos | |
| 5,680,371 A | | 10/1997 | Miklovic | |

FOREIGN PATENT DOCUMENTS

JP      2000-209690      7/2000

* cited by examiner

Primary Examiner—Ian J. Lobo
(74) Attorney, Agent, or Firm—Jordan and Hamburg LLP (57) ABSTRACT

An underwater detection apparatus comprises a transducer, a transmitter capable of generating transmitting signals of a plurality of respective frequencies and for generating a transmitting signal, a broadband trap circuit for transferring the transmitting signal fed from the transmitter to the transducer and for passing an echo signal fed from the transducer, a preamplifier for amplifying the echo signal fed from the broadband trap circuit, a mixer for converting an output of the preamplifier into a signal of a specific frequency, a filter for selectively passing the signal of only the specific frequency-band output from the mixer, a main amplifier for amplifying an output of the filter, an A/D converter for converting an output of the main amplifier into a digital form, and a display circuit for displaying the digitized output of the A/D converter on a monitor, wherein the preamplifier is of a low-gain type.

12 Claims, 5 Drawing Sheets

UNDERWATER DETECTION APPARATUS

BACKGROUND OF THE INVENTION AND RELATED ART STATEMENT

The present invention relates to ultrasonic underwater detection apparatuses.

The invention will be explained as embodied in a fish finder installed in a ship, for detecting underwater conditions beneath the own ship.

Figure 1:
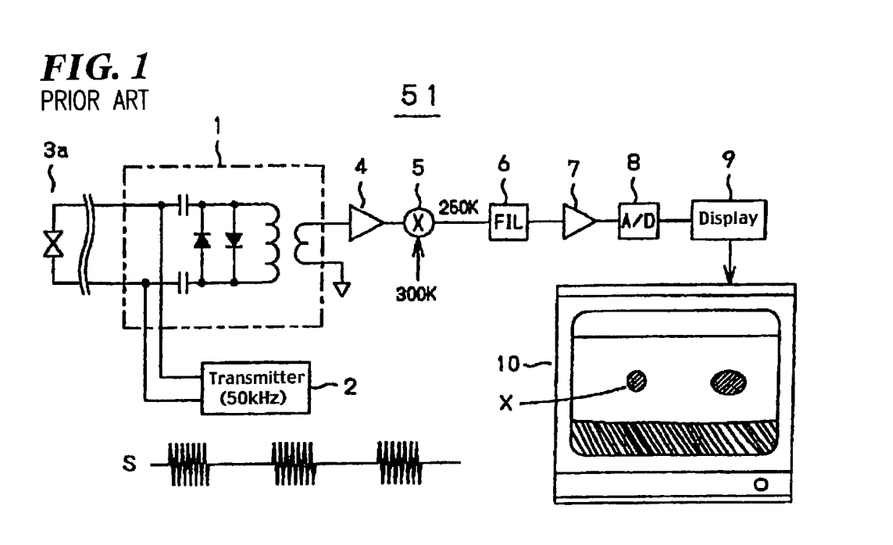
FIG. 1 is a block diagram of a conventional fish finder.

FIG. 1 is a general block diagram of a conventional fish finder 51 comprising one transmit-receive channel. The fish finder is generally used in a bad environment having various background noises such as a ship's running noise and noises produced in the ship. A trap circuit 1 supplies a 50 kHz transmitting burst signal S fed from a transmitter 2 to a transducer 3a and delivers a received echo signal fed from the transducer 3a to a preamplifier 4.

The transducer 3a is connected to the trap circuit 1 by means of two electric conductors. The length of the two electric conductors is, for example, more than five meters depending on the size of the own ship. The received echo signal from the transducer 3a mainly containing a 50 kHz component is mixed with a 300 kHz locally generated signal in a mixer 5. A frequency-converted output signal of the mixer 5 is entered to a filter 6, which passes only a 250 kHz analog received signal component whose frequency is equal to the difference between the frequencies of the raw received signal and the locally generated signal. The 250 kHz analog received signal is then amplified by a main amplifier 7 and converted into a digital signal by an analog-to-digital (A/D) converter 8. The digital received signal output from the A/D converter 8 is converted into a video signal suited for on-screen display by a display circuit 9 and this video signal is stored in a video random-access memory (RAM) provided in the display circuit 9. The video signal stored in the video RAM is converted back to an analog signal, which is delivered to a monitor 10, whereby underwater situations under the ship detected along a track of the ship on which the fish finder 51 is installed are displayed.

The trap circuit 1 is essentially a resonant circuit formed of a coil L and a capacitor C, and has a single resonant frequency. For this reason, the trap circuit 1 is designed to have a resonant frequency of 50 kHz when the operating frequency of the transducer 3a is 50 kHz. Accordingly, only one transducer 3a having the same resonant frequency as the trap circuit 1 can be connected to the trap circuit 1 and, therefore, it has been necessary to replace the fish finder when the transducer 3a has been replaced with one having an operating frequency of 200 kHz, for example.

There have been used various frequencies such as 15 kHz, 28 kHz, 38 kHz, 50 kHz, 88 kHz, 150 kHz or 200 kHz to excite ultrasonic transducers for fish finders. Various fish finders corresponding to these kinds of transducers respectively have to be manufactured and provided to users.

When a transducer which had been installed in the ship is desired to be used, there could be used only one type of fish finder operating on the same frequency as the operating frequency of the transducer.

Figure 2:
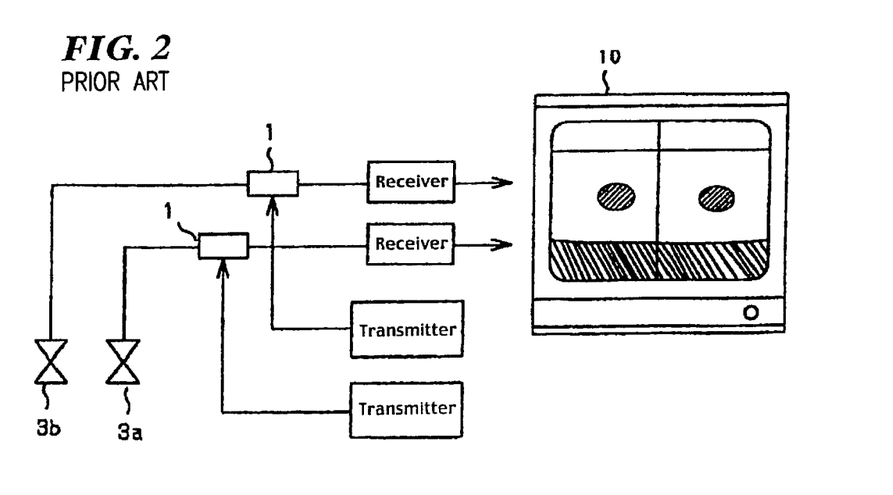
FIG. 2 is a diagram showing a fish finder employing a two-channel transmit-receive circuit configuration.

Sounding the same area with two different frequencies produces such an advantageous effect that a comparison of echoes taken with the two frequencies allow easy discrimination of fish species in fish schools X or of the nature of a sea floor. To enable dual-frequency sounding, a conventional dual-frequency fish finder has two channels of transmitting and receiving circuits, two transducers 3a of different frequencies connected to the respective channels, and a monitor 10 which presents echoes of the two frequencies side by side on a single screen divided into two display areas as shown in FIG. 2.

Provision of the two-channel transmitting and receiving circuits, however, results in an increase in the mechanical size of the fish finder as well as in equipment cost.

SUMMARY OF THE INVENTION

The present invention has been made to solve the aforementioned problems of the prior art.

An object of the present invention is to provide an ultrasonic underwater detection apparatus which is capable of operating on a wide range of transducer frequencies and performing multi-frequency transmission and reception with a one-channel circuit configuration.

Another object of the invention is to provide an underwater detection apparatus which is capable of meeting demands from users in terms of frequency desired by the users.

Another object of the invention is to provide an underwater detection apparatus which simplifies manufacture and inventory control of fish finders, and the like.

Another object of the invention is to provide an underwater detection apparatus which can be connected to an ultrasonic transducer unit which is capable of transmitting or receiving signals having any one of carrier frequencies used in the fishing industry.

Another object of the invention is to provide an underwater detection apparatus which is capable of selecting and using an ultrasonic transducer unit having an operating frequency from a plurality of ultrasonic transducer units having mutually different operating frequencies.

Another object of the invention is to provide an underwater detection apparatus which is capable of selecting an operating frequency, or a combination of multiple operating frequencies, from a wide range of transducer frequencies and performing either single-frequency or multi-frequency transmission and reception with a one-channel circuit configuration, thereby eliminating the need to replace the fish finder when using a transducer having a different operating frequency.

According to an aspect of the invention, an underwater detection apparatus comprises a transducer for transmitting and receiving ultrasonic signals into and from the water, a transmitter for generating a transmission signal, a broadband trap circuit connected to the transducer by two conductive lines of a length more than five meters for transferring the transmission signal from the transmitter to the transducer and for passing an echo signal from the transducer, a preamplifier for amplifying the echo signal from the trap circuit, a mixer for converting the echo signal from the preamplifier into a signal of a specific frequency, a filter for selectively passing the signal of the specific frequency-band output from the mixer, a main amplifier for amplifying the echo signal from the filter, an A/D converter for converting the echo signal from the amplifier into a digital form, and an indicator for displaying the echo signal from the A/D converter.

Since the trap circuit does not include a resonant circuit, it has a broadband applicability, working independently of the frequency. Thus, operation of the trap circuit is not limited to any single transmitting frequency of the transmitter. Rather, the transmitting frequency of the transmitter may be determined according to the operating frequency of the transducer. If the transmitting frequency of the transmitter is freely variable, it would be possible to use a transducer having a desired operating frequency.

According to another aspect of the invention, an underwater detection apparatus comprises a first transducer for transmitting and receiving ultrasonic waves on its operating frequency F1, a second transducer for transmitting and receiving ultrasonic waves on its operating frequency F2, a transmitter for generating a transmitting signal, a trap circuit for transferring the transmitting signal fed from the transmitter to the transducers and for passing an echo signal fed from the transducers, a preamplifier for amplifying the echo signal fed from the trap circuit, a mixer for converting the echo signal fed from the preamplifier into a signal of a specific frequency, a filter for selectively passing the signal of only the specific frequency output from the mixer, a main amplifier for amplifying the echo signal fed from the filter, an A/D converter for converting the echo signal fed from the main amplifier into a digital form, and a display circuit for displaying the digitized echo signal fed from the A/D converter on a monitor, wherein the trap circuit includes a coil and a diode, or a resistor and a diode, the first transducer and the second transducer are connected in parallel to the trap circuit via a low-pass filter and a high-pass filter, respectively, the transmitting signal of the transmitter is alternately switched between the operating frequency F1 of the first transducer and the operating frequency F2 of the second transducer, and wherein a locally generated signal fed into the mixer is alternately switched between two specific frequencies such that the mixer constantly outputs the signal of the fixed frequency regardless of whether the input echo signal has the operating frequency F1 or F2.

Since the trap circuit has a broadband applicability, it is possible to use the first and second transducers having two different operating frequencies F1, F2, for example. With the low-pass filter and the high-pass filter connected to the first and second transducers, respectively, the transmitter can alternately outputs signals of the two frequencies F1, F2. Further, the locally generated signal supplied to the mixer is alternately switched between the two specific frequencies so that the mixer always outputs the signal of the fixed frequency regardless of the operating frequencies F1, F2.

According to another aspect of the invention, the first transducer has a low impedance at the operating frequency F1 and a high impedance at the operating frequency F2 while the second transducer has a low impedance at the operating frequency F2 and a high impedance at the operating frequency F1. This arrangement makes it possible to connect the two transducers in parallel with each other without using the low-pass filter and the high-pass filter.

According to another aspect of the invention, a transducer having two resonance points and usable at two operating frequencies F1, F2 is connected to the trap circuit instead of the first and second transducers.

It will be understood from the present Specification that since the underwater detection apparatus of the invention employs a broadband trap circuit and a low-gain preamplifier having good linearity to eliminate, where necessary, harmonic noise, it is possible to connect transducers of various operating frequencies. Furthermore, as the invention makes it possible to transmit and receive signals of multiple frequencies with a one-channel circuit configuration using transducers having different operating frequencies, it is possible to provide a highly-functional small-sized fish finder at low cost.

According to further aspect of the invention, an underwater detection apparatus comprises at least one transducer for transmitting and receiving ultrasonic signals, a transmitting signal generator for generating a transmitting signal of at least one frequency for driving the at least one transducer, a broadband trap circuit comprising a coil and a diode, or a resistor and a diode for transferring the transmitting signal fed from the transmitting signal generator to the at least one transducer selectively installed from multiple transducers and for passing an echo signal fed from the at least one transducer, a preamplifier for amplifying the echo signal fed from the trap circuit, a mixer for converting the echo signal of the at least one frequency fed from the preamplifier into a signal of a specific frequency, and a filter for selectively passing the signal of only the specific frequency-band output from the mixer.

Yet, according to another aspect of the invention, an underwater detection apparatus comprises an ultrasonic transducer for transmitting and receiving ultrasonic signals, a transmitting signal generator for generating a transmitting signal of a frequency for driving said ultrasonic transducer, a broadband trap circuit for transferring the transmitting signal from the transmitting signal generator to said transducer and for passing an echo signal fed from said ultrasonic transducer, a mixer for converting the echo signal of the frequency from said ultrasonic transducer into a signal of a specific frequency, a narrowband filter for selectively passing the signal of only the specific frequencies from said mixer, an amplifier for amplifying the echo signal from the filter, an A/D converter for converting the echo signal from the amplifier into a digital form, and an indicator for displaying the echo signal from the A/D converter.

According to another aspect of the invention, an underwater detection apparatus comprises an ultrasonic transducer for transmitting and receiving ultrasonic signals of a frequency, a transmitting signal generator capable of generating transmitting signals of a plurality of frequencies and outputting a signal of a frequency selected for driving said ultrasonic transducer, a broadband trap circuit for transferring the transmitting signal from the transmitting signal generator to said transducer and for passing an echo signal fed from said ultrasonic transducer, a local oscillator capable of generating local signals of a plurality of frequencies, a mixer for converting the echo signal of the frequency from said ultrasonic transducer into a signal of a specific frequency based on the echo signal and the local signal of a corresponding frequency selected, a narrowband filter for selectively passing the signal of only the specific frequencies from said mixer, an amplifier for amplifying the echo signal from the filter, an A/D converter for converting the echo signal from the amplifier into a digital form, and an indicator for displaying the echo signal from the A/D converter.

According to another aspect of the invention, an underwater detection apparatus comprises a first transducer for transmitting and receiving ultrasonic signals on its operating frequency F1, a second transducer for transmitting and receiving ultrasonic signals on its operating frequency F2, a transmitter for generating transmitting signals of the two frequencies at different times, a broadband trap circuit for transferring the transmitting signal from the transmitter to the transducers and for passing an echo signal from the transducers, a preamplifier for amplifying the echo signal from the trap circuit, a mixer for converting the echo signal from the preamplifier into a signal of a specific frequency, a filter for selectively passing the signal of only the specific frequency output from the mixer, a main amplifier for amplifying the echo signal from the filter, an A/D converter for converting the echo signal from the main amplifier into a digital form, and a display circuit for displaying the digitized echo signal from the A/D converter on a monitor.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 3:
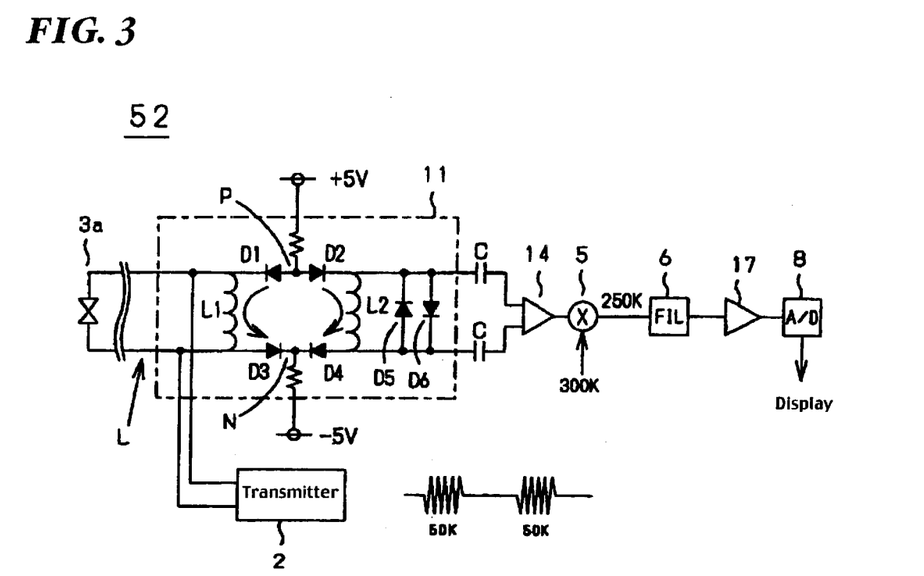
FIG. 3 is a block diagram of a fish finder according to a first embodiment of the invention.

FIG. 3 is a block diagram of a fish finder 52 according to a first embodiment of the invention, in which elements equivalent to those shown in FIG. 1 are designated by the same reference numerals. The fish finder 52 employs a trap circuit 11 having connecting points P, N on two lines L. Anodes of diodes D1, D2 are connected to the connecting point P while cathodes of diodes D3, D4 are connected to the connecting point N.

A coil L1 is connected between a cathode of the diode D1 and an anode of the diode D3, and a transducer 3a is connected between both ends of the coil L1. Also, a coil L2, as well as two diodes D5, D6 connected in parallel but in opposite directions, are connected between a cathode of the diode D2 and an anode of the diode D4.

The cathode of the diode D2 and the anode of the diode D4 are connected to input terminals of a preamplifier 14 in a succeeding stage through respective capacitors C. It is to be noted that the cathode of the diode D2 and the anode of the diode D4 can be connected to input terminals of the mixer 5 in a succeeding stage through respective capacitors C without the preamplifier therebetween.

Since +5V and −5V voltages are supplied to the connecting points P, N through resistors, respectively, a current of about 10 mA flows through the diode D1, the coil L1 and the diode D3, and through the diode D2, the coil L2 and the diode D4, in this order. When an echo signal received by the transducer 3a is applied to the coil L1, the current flowing through the coil L1 is modulated by the received signal. As a result, a voltage containing components of the received signal occurs between the connecting points P, N. This voltage is taken out through the diodes D2, D4 and supplied to the preamplifier 14 through the coupling capacitors C which cut off a direct-current (dc) component of the voltage. The diodes D5, D6 clip a high-voltage transmission burst signal for protecting a receiving circuit including the preamplifier 14.

The capacitors C are provided just for blocking the dc component contained in the voltage signal. The capacitance of these capacitors C is determined such that they do not produce resonance with the coils L1, L2 at least in an operating frequency range (tens to hundreds of kHz) of the fish finder 52. Since the trap circuit 11 thus constructed includes no resonant circuit, it has a broadband of frequency. Therefore, the operating frequency of the transducer 3a is not limited to a specific frequency (e.g., 50 kHz) but the trap circuit 11 is usable in a wide range of frequencies.

If the trap circuit 11 is simply substituted for the trap circuit 1 in the conventional fish finder 51 of FIG. 1, however, there can arise a new problem which is described below.

Figure 4:
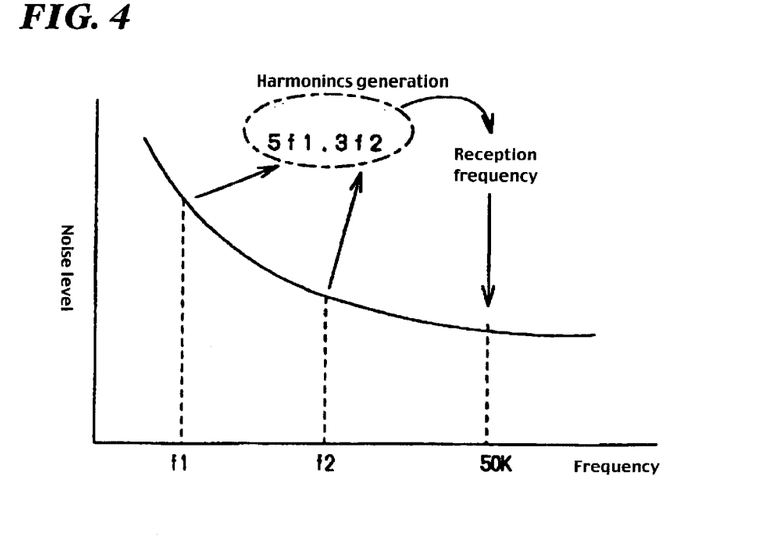
FIG. 4 is a graph showing a distribution of noise components measured underwater at installation site of a transducer.

FIG. 4 shows a distribution of noise components measured underwater at installation site of the transducer 3a. Low-frequency noise components come principally from a ship's running noise and surface noise. It is known that these noise components sharply increases in inverse proportion to the square of frequency. These noise components are mixed with and received together with the echo signal. Since the trap circuit 11 has the broadband in frequency, the noise components are delivered to the preamplifier 14 together with the echo signal.

If the preamplifier 14 is of a high-gain type like the preamplifier 4 shown in FIG. 1, the low-frequency noise components of high input levels would reach a saturation level, producing the third and fifth harmonics, because the preamplifier 4 has poor linearity. If these harmonics contain a 50 kHz component which is equal to the receiving frequency, unwanted noise will be mixed in the received signal, making it impossible to obtain desired sounding results.

This kind of inconvenience does not occur in the conventional fish finder 51 of FIG. 1 since its trap circuit 1 passes only the 50 kHz input signal.

To overcome the aforementioned problem, the fish finder 52 of this invention employs a low-gain type preamplifier having a gain about 10 dB as the preamplifier 14 and the occurrence of intermodulation is prevented by improving amplification linearity. Loss of gain in the preamplifier 14 is compensated for by a main amplifier 17. A filter 6 used in the fish finder 52 is of a narrow-band type having a passband of 1 kHz to 5 kHz.

Since the operating frequency of the transducer 3a is 50 kHz, a transmitter 2 is set to a transmitting frequency of 50 kHz in this embodiment. If, however, the transmitting frequency is variable, transducers of desired operating frequencies can be selectively used. Specifically, if there are provided 15 kHz, 50 kHz and 200 kHz oscillators 25a, 25b, 25c and a switch 24 for selectively connecting one of these oscillators 25a, 25b, 25c to a transmitter 23 as shown in FIG. 5, it is possible to selectively use transducers having the corresponding operating frequencies.

Figure 5:
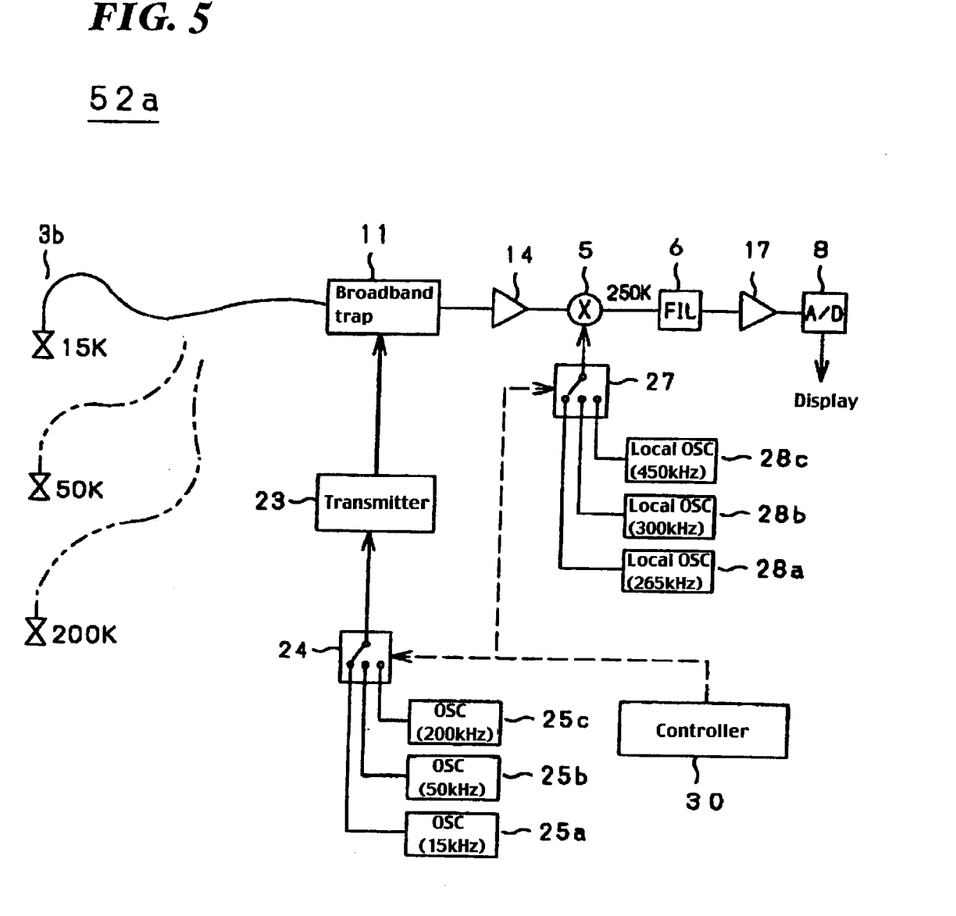
FIG. 5 is a block diagram of a fish finder according to one variation of the first embodiment.

In a fish finder 52a of FIG. 5, which is a variation of the first embodiment, one of 265 kHz, 300 kHz and 450 kHz local oscillators 28a, 28b, 28c is selected by a switch 27 depending on which one of the oscillator 25a, 25b and 25c is selected, so that a frequency-converted output signal from a mixer 5 has a fixed frequency of 250 kHz regardless of the choice of transmitting frequency. The switches 24, 27 are driven by a controller 30.

Although FIG. 5 shows the three each oscillators 25a, 25b, 25c and the local oscillators 28a, 28b, 28c, one each oscillator and local oscillator capable of oscillating at selected frequencies are provided in actuality, so that the circuit configuration does not necessarily become complicated. In FIG. 5, transducers 3b and a trap circuit 11 are shown in the form of a single-line diagram for the sake of simplification while the transducer 3a and the trap circuit 11 are depicted in the form of a two-line diagram in FIG. 3. Connections for the transducers 3b of FIG. 5 are however completely the same as for the transducer 3a of FIG. 3. (This also applies to the following Figures.).

Figure 6:
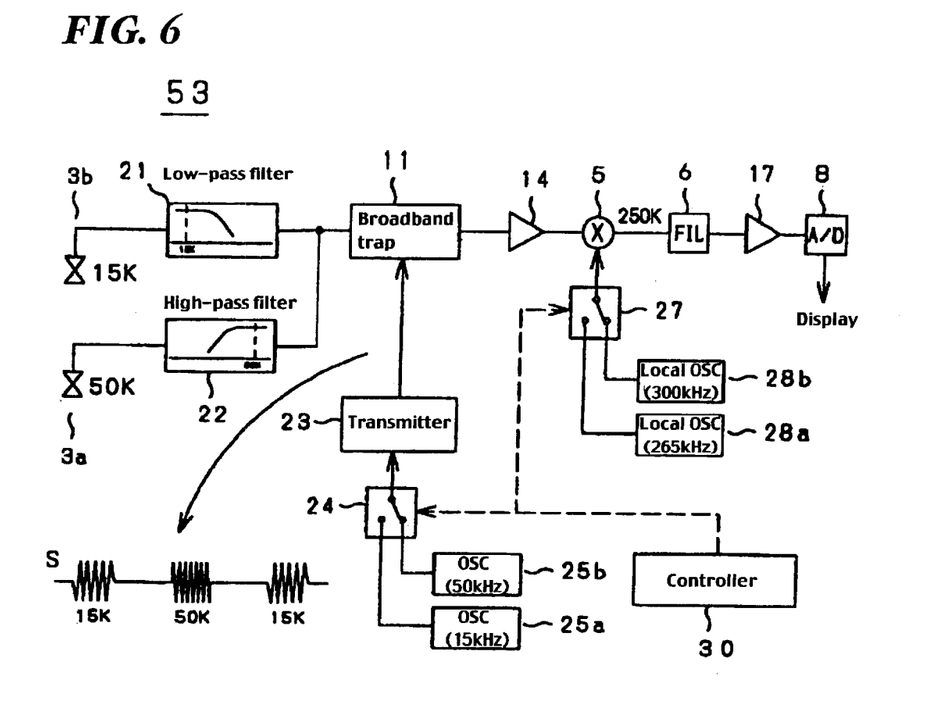
FIG. 6 is a block diagram of a fish finder according to a second embodiment of the invention.
Figure 7:
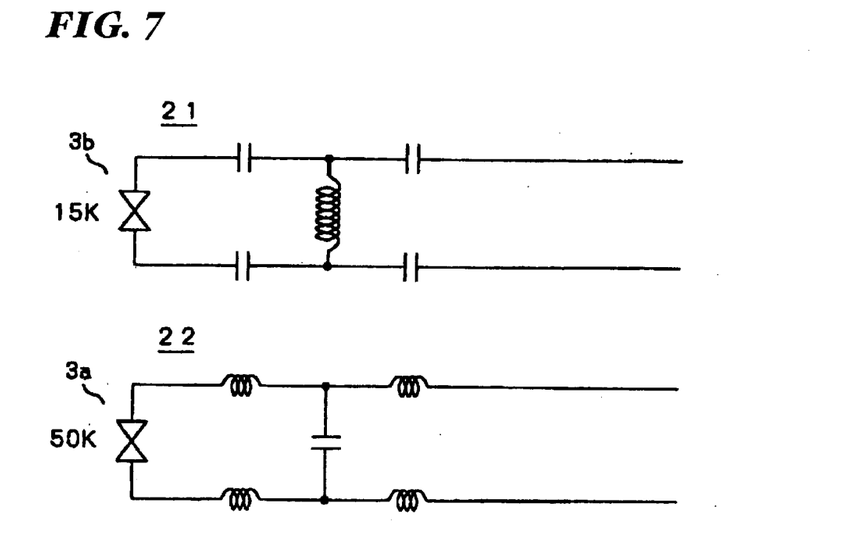
FIG. 7 shows circuit diagrams of low-pass and high-pass filters used in FIG. 6.

FIG. 6 is a block diagram of a fish finder 53 according to a second embodiment of the invention, in which elements equivalent to those shown in FIG. 3 are designated by the same reference numerals. Two transducers 3b, 3a having operating frequencies of 15 kHz and 50 kHz, for example, arranged in parallel are connected to a broadband trap circuit 11 through a low-pass filter 21 and a high-pass filter 22, respectively. The low-pass filter 21 and the high-pass filter 22 constitute typical inductance-capacitance (LC) circuits as shown in FIG. 7.

A transmitting signal S output from a transmitter 23 contains 15 kHz and 50 kHz components. This is because 15 kHz and 50 kHz signals are alternately supplied from oscillators 25b and 25a, respectively, to the transmitter 23 via a switch 24. The 15 kHz and 50 kHz components are separated from each other by the low-pass filter 21 and the high-pass filter 22 and, as a consequence, a 15 kHz transmitting signal is fed into the 15 kHz transducer 3b while a 50 kHz transmitting signal is fed into the 50 kHz transducer 3a. The transducers 3b and 3a alternately transmit 15 kHz and 50 kHz ultrasonic signals.

On the other hand, 300 kHz and 265 kHz signals output from local oscillators 28b and 28a are alternately supplied to a mixer 5 via a switch 27. A controller 30 controls the switches 24 and 27 such that the 300 kHz locally generated signal is supplied to the mixer 5 when an echo signal produced by the 50 kHz transmitting signal is being processed, and the 265 kHz locally generated signal is supplied to the mixer 5 when an echo signal produced by the 15 kHz transmitting signal is being processed. As a result, the mixer 5 always outputs a 250 kHz signal.

Since the trap circuit 11 used in this embodiment is of a broadband type, it has a capability to deliver received signals of two different frequencies, 15 kHz and 50 kHz, to a preamplifier 14. Accordingly, it is possible to transmit and receive the dual-frequency signals with the above-described one-channel circuit configuration, so that soundings obtained with the two different frequencies can be displayed side by side on a single monitor 10 as shown in FIG. 2. To produce a dual-frequency echogram of this kind, the echo signal of one transmitting frequency is taken in during 0% to 50% of each successive horizontal scanning line time and the echo signal of the other transmitting frequency is taken in during 51% to 100% of each successive horizontal scanning line time.

Figure 8:
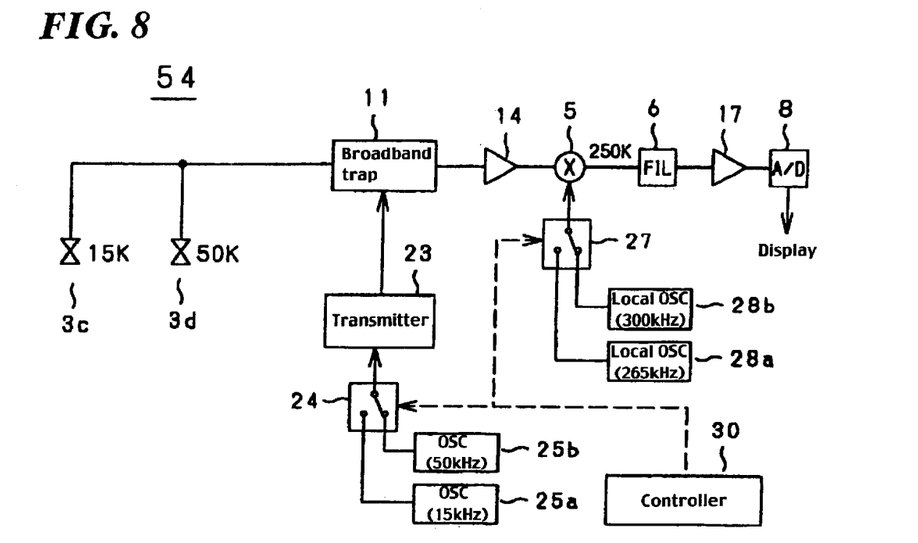
FIG. 8 is a block diagram of a fish finder according to a third embodiment of the invention.

FIG. 8 is a block diagram of a fish finder 54 according to a third embodiment of the invention, in which elements equivalent to those shown in FIG. 6 are designated by the same reference numerals. Unlike the fish finder 53 of FIG. 6, this fish finder 54 does not incorporate the low-pass filter 21 or the high-pass filter 22. Instead, a 15 kHz transducer 3c and a 50 kHz transducer 3d arranged in parallel are connected directly to a broadband trap circuit 11.

In this embodiment, the transducer 3c has a low impedance at its operating frequency of 15 kHz and a high impedance at 50 kHz, whereas the transducer 3d has a low impedance at its operating frequency of 50 kHz and a high impedance at 15 kHz.

As is the case with the fish finder 53 of FIG. 6, transmission signals containing 15 kHz and 50 kHz components occurring in successive turns are supplied from a transmitter 23 to the broadband trap circuit 11. While both the 15 kHz and 50 kHz signal components are delivered to the transducers 3c and 3d, the 15 kHz signal component is mostly entered into the transducer 3c which has the low impedance at 15 kHz, and the 50 kHz signal component is mostly entered into the transducer 3d which has the low impedance at 50 kHz. Thus, the fish finder 54 of FIG. 8 can transmit and receive the dual-frequency signals like the fish finder 53 of FIG. 7.

Figure 9:
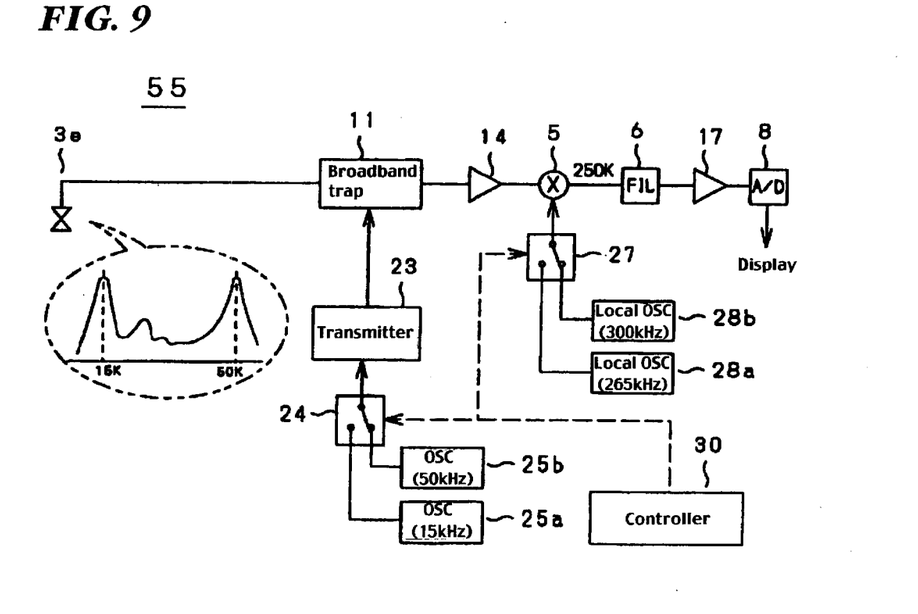
FIG. 9 is a block diagram of a fish finder according to a fourth embodiment of the invention.

FIG. 9 is a block diagram of a fish finder 55 according to a fourth embodiment of the invention. This fish finder 55 is provided with a single transducer 3e having two resonant frequencies, 15 kHz and 50 kHz. Transmission signals containing 15 kHz and 50 kHz components occurring in successive turns are supplied from a transmitter 23 to the transducer 3e through a broadband trap circuit 11. When the 15 kHz signal component is supplied, the transducer 3e resonates at 15 kHz and transmits 15 kHz ultrasonic waves, and when the 50 kHz signal component is supplied, the transducer 3e resonates at 50 kHz and transmits 50 kHz ultrasonic waves.

The fish finder 53 of FIG. 6 may further comprise a third transducer whose operating frequency is between 15 kHz and 50 kHz, a bandpass filter which allows the operating frequency of the third transducer pass through, as well as a corresponding oscillator and local oscillator. The fish finder 53 thus modified will be able to transmit and receive triple-frequency signals using its one-channel circuit configuration.

Likewise, the fish finder 54 of FIG. 8 and the fish finder 55 of FIG. 9 can transmit and receive signals of more than two frequencies if modified in a similar way. It should be understood that the operating frequencies, such as 15 kHz and 50 kHz, shown in the foregoing embodiments are intended to be simply illustrative and that the invention is not limited to these operating frequencies. Furthermore, although the invention has been described, by way of example, with reference to the fish finders 52, 52a, 53, 54, the aforementioned principal features of the invention are applicable to searchlight sonars and scanning sonars as well.

While the invention has been described in detail and with reference to specific embodiments thereof, it will be apparent to one skilled in the art that various changes and modifications can be made therein without departing from the spirit and the scope of invention.

What is claimed is:

1. An underwater detection apparatus comprising:
   a transducer for transmitting and receiving ultrasonic signals into and from the water;
   a transmitter for generating a transmission signal;
   a broadband trap circuit connected to the transducer by two conductive lines of a length more than five meters for transferring the transmission signal from the transmitter to the transducer and for passing an echo signal from the transducer;
   a preamplifier for amplifying the echo signal from the trap circuit;
   a signal generator for generating signals of a plurality of different signals;
   a mixer having two inputs with one input receiving the echo signal from the preamplifier and the other input receiving a signal of the signals of a plurality of different frequencies generated from the signal generator for converting the echo signal from the preamplifier into a signal of a specific frequency;

a filter for selectively passing the signal of the specific frequency output from the mixer;

a main amplifier for amplifying the echo signal from the filter;

an A/D converter for converting the echo signal from the amplifier into a digital form; and an indicator for displaying the echo signal from the A/D converter.

2. An underwater detection apparatus comprising:

a first transducer for transmitting and receiving ultrasonic signals on its operating frequency F1;

a second transducer for transmitting and receiving ultrasonic signals on its operating frequency F2;

a transmitter for generating a transmitting signal;

a trap circuit for transferring the transmitting signal from the transmitter to the transducers and for passing an echo signal from the transducers;

a preamplifier for amplifying the echo signal from the trap circuit;

a mixer for converting the echo signal from the preamplifier into a signal of a specific frequency;

a filter for selectively passing the signal of only the specific frequency-band output from the mixer;

a main amplifier for amplifying the echo signal from the filter;

an A/D converter for converting the echo signal from the main amplifier into a digital form; and a display circuit for displaying the digitized echo signal from the A/D converter on a monitor;

wherein the trap circuit includes a coil and a diode, or a resistor and a diode, the first transducer and the second transducer are connected in parallel to the trap circuit via a low-pass filter and a high-pass filter, respectively, the transmitting signal of the transmitter is alternately switched between the operating frequency F1 of the first transducer and the operating frequency F2 of the second transducer, and wherein a locally generated signal fed into the mixer is alternately switched between two specific frequencies such that the mixer constantly outputs the signal of the fixed frequency regardless of whether the input echo signal has the operating frequency F1 or F2.

3. An underwater detection apparatus according to claim 2, wherein the first transducer has a low impedance at the operating frequency F1 and a high impedance at the operating frequency F2 while the second transducer has a low impedance at the operating frequency F2 and a high impedance at the operating frequency F1, instead of providing the low-pass filter and the high-pass filter.

4. An underwater detection apparatus according to claim 2, wherein a transducer having two resonance points and usable at two operating frequencies F1, F2 is connected to the trap circuit instead of the first and second transducers.

5. An underwater detection apparatus according to one of claims 2 through 4, wherein an electric current flown through the coil of the trap circuit via the diode thereof is modulated by the echo signal fed from the transducer by applying the echo signal to both ends of the coil, and a modulating wave is taken out from the trap circuit as the echo signal.

6. An underwater detection apparatus according to one of claims 1 to 5, wherein the preamplifier has a low gain of approximately 10 dB and a consequent loss of gain is compensated for by the main amplifier.

7. An underwater detection apparatus comprising:

at least one transducer for transmitting and receiving ultrasonic signals;

a transmitting signal generator for generating a transmitting signal of at least one frequency for driving the at least one transducer;

a broadband trap circuit comprising a coil and a diode, or a resistor and a diode for transferring the transmitting signal fed from the transmitting signal generator to the at least one transducer selectively activated from multiple transducers installed in parallel and for passing an echo signal fed from the at least one transducer;

a preamplifier for amplifying the echo signal fed from the trap circuit;

a mixer for converting the echo signal of the at least one frequency fed from the preamplifier into a signal of a specific frequency; and a filter for selectively passing the signal of only the specific frequency-band output from the mixer.

8. An underwater detection apparatus comprising:

an ultrasonic transducer for transmitting and receiving ultrasonic signals;

a transmitting signal generator for generating a transmitting signal of a frequency for driving said ultrasonic transducer;

a broadband trap circuit for transferring the transmitting signal of frequencies from 15 kHz to 200 kHz from the transmitting signal generator to said transducer and for passing an echo signal fed from said ultrasonic transducer;

a mixer for converting the echo signal of the frequency from said ultrasonic transducer into a signal of a specific frequency;

a narrowband filter for selectively passing the signal of only the specific frequencies from said mixer;

an amplifier for amplifying the echo signal from the filter;

an A/D converter for converting the echo signal from the amplifier into a digital form; and an indicator for displaying the echo signal from the A/D converter.

9. An underwater detection apparatus as claimed in claim 8 further comprises a preamplifier for amplifying the echo signal from the trap circuit and for outputting the signal to the mixer.

10. An underwater detection apparatus as claimed in claim 9 wherein the preamplifier and the amplifier amplify the echo signal in such a way that noises supplied thereto are suppressed.

11. An underwater detection apparatus comprising:

an ultrasonic transducer for transmitting and receiving ultrasonic signals of a frequency;

a transmitting signal generator capable of generating transmitting signals of a plurality of frequencies and outputting a signal of a frequency selected for driving said ultrasonic transducer;

a broadband trap circuit for transferring the transmitting signal from the transmitting signal generator to said transducer and for passing an echo signal fed from said ultrasonic transducer;

a local oscillator capable of generating local signals of a plurality of frequencies;

a mixer for converting the echo signal of the frequency from said ultrasonic transducer into a signal of a specific frequency based on the echo signal and a local signal of a corresponding frequency selected from the local signals of a plurality of different frequencies;

a narrowband filter for selectively passing the signal of only the specific frequencies from said mixer;

an amplifier for amplifying the echo signal from the filter;

an A/D converter for converting the echo signal from the amplifier into a digital form; and an indicator for displaying the echo signal from the A/D converter.

12. An underwater detection apparatus comprising:

a first transducer for transmitting and receiving ultrasonic signals on its operating frequency F1;

a second transducer for transmitting and receiving ultrasonic signals on its operating frequency F2;

a transmitter for generating transmitting signals of the two frequencies;

a broadband trap circuit for transferring the transmitting signal from the transmitter to the transducers and for passing an echo signal from the transducers;

a preamplifier for amplifying the echo signal from the trap circuit;

a mixer for converting the echo signal from the preamplifier into a signal of a specific frequency;

a filter for selectively passing the signal of only the specific frequency output from the mixer;

a main amplifier for amplifying the echo signal from the filter;

an A/D converter for converting the echo signal from the main amplifier into a digital form; and a display circuit for displaying the digitized echo signal from the A/D converter on a monitor.

* * * * *